United States Patent
Tsenter et al.

(10) Patent No.: US 6,425,440 B1
(45) Date of Patent: Jul. 30, 2002

(54) RECIPROCAL HEAT EXCHANGER

(75) Inventors: Boris Tsenter, Roswell, GA (US); Alexei Petrov, St. Petersburg (RU)

(73) Assignee: Borst, Inc., Chamblee, GA (US)

( * ) Notice: Subject to any disclaimer, the term of this patent is extended or adjusted under 35 U.S.C. 154(b) by 0 days.

(21) Appl. No.: 09/611,448

(22) Filed: Jul. 6, 2000

Related U.S. Application Data (60) Provisional application No. 60/142,667, filed on Jul. 6, 1999.

(51) Int. Cl.$^7$ ............................................... F28D 15/00
(52) U.S. Cl. .................... 165/104.12; 62/480; 62/259.2; 429/59
(58) Field of Search ........................... 165/80.4, 104.12, 165/104.22, 104.23, 104.33; 62/470, 480, 259.2; 429/59, 87, 156

(56) References Cited

U.S. PATENT DOCUMENTS

| | | | |
|---|---|---|---|
| 4,402,915 A | * 9/1983 | Nishizaki et al. | 165/104.12 |
| 4,523,635 A | 6/1985 | Nishizaki et al. | |
| 4,593,534 A | 6/1986 | Bloomfield | |
| 4,995,235 A | * 2/1991 | Halene | 165/104.12 |
| 5,168,708 A | * 12/1992 | Siegel | 165/104.12 |
| 5,233,836 A | * 8/1993 | Siegel | 165/104.12 |
| 5,349,499 A | 9/1994 | Yamada et al. | |
| 5,477,705 A | * 12/1995 | Meunier | 62/480 |
| 5,746,064 A | 5/1998 | Tsenter | |
| 5,768,906 A | 6/1998 | Tsenter | |
| 5,787,713 A | 8/1998 | Russo | |
| 5,996,957 A | 10/1999 | Malhammer et al. | |
| 6,055,814 A | 5/2000 | Song | |
| 6,055,815 A | 5/2000 | Peterson | |
| 6,092,372 A | 5/2000 | Russo | |
| 6,167,721 B1 | 1/2001 | Tsenter | |

* cited by examiner

*Primary Examiner*—Allen Flanigan
*Assistant Examiner*—Terrell McKinnon
(74) *Attorney, Agent, or Firm*—Benesch, Friedlander, Coplan & Aronoff, LLP; Raymond A. Miller (57) ABSTRACT

A reciprocal design for an electrochemical heat exchanger comprised of a gas-based driving system, a liquid-based cooling system, and a non-permeable flexible diaphragm to physically separate the contents of the driving system from the contents of the cooling system while maintaining a pressure based communication between the contents of the two systems. The gas-based driving system utilizes a hydrogen electrochemical pump to induce circulation of a liquid coolant through the cooling system. Said liquid coolant exchanges heat with the object to be cooled and transfers heat out of the heat exchange system by way of matched banks of radiator tubes.

16 Claims, 2 Drawing Sheets

RECIPROCAL HEAT EXCHANGER

This application claims the benefit of the earlier filing date of provisional application No. 60/142,667 filed on Jul. 6, 1999.

FIELD OF THE INVENTION

This invention relates generally to a heat exchange system, more particularly to a radiator design in a heat exchange system which utilizes a reciprocating electrochemical hydrogen pump, and even more particularly to a radiator design in a heat exchange system which utilizes a reciprocating electrochemical hydrogen pump and a liquid cooling agent that is mechanically isolated from the reciprocating electromechanical hydrogen pump.

BACKGROUND OF THE INVENTION

Many devices must be cooled as they operate. Generally speaking, this cooling is effectuated by transferring heat from the device to be cooled, through a cooling agent of some sort, and finally to a thermally conductive heat sink. There are many different solutions for using heat sinks for the cooling of electronic devices and other parts. The heat exchange system must be designed to take advantage of the unique characteristics of the chosen cooling agent.

Electronic components are used in a countless array of devices to facilitate the faster processing of information. Although small in size, these devices and, more specifically, the integrated circuit chips that make up these devices, emit a tremendous amount of heat that is potentially detrimental to the chips themselves, the surrounding devices, and even the users of these electronic or other devices.

In a simple air cooled heat exchange system, the heat from be object to be cooled is transferred to the air by way of the surface area of a radiator. Radiators with different surfaces, sizes, and shapes of fins are selected depending on the amount of heat to be removed from the object to be cooled, the rate and direction of the air flow surrounding the radiator fins, and the temperature tolerance of the cooling device.

Likewise, the cooling of electronic and other devices utilizing a vapor compression refrigeration cycle is known in the art. Vapor compression cooling uses the thermodynamic principles associated with phase transfer, specifically the latent heat of vaporization and the entropy of evaporation of a working fluid. Compression of a vaporous working fluid can occur through mechanical, electrochemical, or other means. Mechanical compression requires a relatively large, heavy, mechanical compressor having a great number of parts which are often bulky and susceptible to wear. Because of these undesirable effects of using a mechanical compressor, electromechanical compressors have been proposed to drive Joule-Thomson refrigeration cycles. (See, for example, U.S. Pat. No. 4,593,534 which is hereby incorporated by reference in its entirety.) This type of compressor is preferred over a mechanical or other compressor because an electrochemical compressor contains no moving parts, is vibration free, and has the potential for long life and reliability.

When a liquid is used as the cooling agent in the heat exchange system, the approach employs a hollow-finned radiator containing a cooling liquid under forced convection. The liquid has a thermal conductivity coefficient which is 200–300 times greater than the thermal conductivity coefficient of a gas, and therefore the liquid coolant radiator system has significant advantages compared with using gas as the heat carrier.

Although thermodynamically efficient, the major problem with using a liquid cooling agent is that the liquid must be circulated through the heat exchange system to ensure that heat is properly transferred from the object to be cooled to the heat sink. Conventionally, an electrical pump is used to push the liquid through the heat exchange system. However, such an electric pump is noisy in operation and cannot operate for an extended period of time without maintenance.

As a solution, the use of an electrochemical pump to carry a beat transfer coolant in a heat exchange system was proposed in U.S. Pat. No. 5,746,064 and U.S. Pat. No. 5,768,906 which are both owned by Applicant and are both incorporated ill their entirety herein by reference. These patents describe art electrochemical pump that is based on an electrochemical cell.

The simplest electrochemical cell consists of at least two electrodes and one or more electrolytes. The electrode at which an electron producing oxidation reaction occurs is the anode. The electrode at which an electron consuming reduction reaction occurs is called the cathode. The direction of the electron flow in the external circuit is always from anode to cathode. In order to drive the electrolysis reaction, it is necessary to apply electric power to the cell electrodes. The electrodes are connected through the electrical leads to an external source of electric power with the polarity being selected to induce the electrolyte anion flow to the anode and the cation flow to the cathode.

Generally speaking, the anode and cathode are made of a substrate material, such as titanium, graphite, or the like, coated with a catalyst such as lead dioxide or other known materials. The selection of a substrate and catalyst is determined by the particular electrode reactions which are to be optimized in a given situation. As a rule, a cathode and an anode produce different products. Classically, these products are hydrogen and oxygen.

Generally, the electrolyte is a liquid which is conductive of ions. The most common applications are fuel cells. In fuel cells, proton exchange membranes are used as electrolytic and catalyst support for providing a reaction of hydrogen oxidation on the one side of the membrane and oxygen reduction reaction on the other side of the membrane. This type of electrochemical cell often produces wasteful water or gas which must then be carried away from the cell's electrodes.

This hydrogen circulating through the heat transfer system from one electrode to the other can be used as the cooling agent in the system. As the gaseous hydrogen travels from one electrode to the other, it comes into thermal contact with the object to be cooled. The hydrogen gas cooling agent can come into direct contact with the object to be cooled or, more likely, the cooling agent will come into direct contact with a member that is in thermal contact with the object to be cooled. Heat will be transferred by this contact from the object to be cooled to the hydrogen gas. As the gas circulates, the gas will then come into contact with a heat sink or other heat well where heat will be transferred from the gaseous hydrogen to the heat sink, restoring the hydrogen's original thermal properties. At the end of the circulation cycle, the hydrogen gas is used up in the oxidation reaction at the anode.

Hydrogen as discussed herein is very useful as a cooling agent. Hydrogen has a thermoconductivity value seventeen times that of air. However, hydrogen does have some limitations when compared to liquid cooling agents. For example, hydrogen has a low magnitude of specific capacity which may make hydrogen less appealing for larger volume applications. For larger volume applications, the system will be more efficient if the hydrogen is used as a pump for a liquid cooling agent.

Because of the small magnitude of specific thermal capacity of the hydrogen gas, a liquid cooling agent is often used in combination with the hydrogen pump. As such, the liquid cooling agent is inserted into the tube connecting the two electrodes in the electrochemical pump to each other. As the hydrogen circulates through the pump from cathode to anode, the gas pushes the liquid cooling agent through the tube also. In this system, it is the liquid cooling agent, not the hydrogen gas, that performs the heat transfer utilizing the benefits of greater thermal mass explained above.

The major problem with using the hydrogen and liquid cooling agent combination is that only the hydrogen is used up in the oxidation reaction at the anode. Hence, the hydrogen can keep circulating throughout the system, but the liquid cooling agent cannot do so. Hence, the hydrogen gas will compress the liquid cooling agent towards the anode end of the system as much as possible, but the system's heat exchange properties are quite limited at that point in time. Hence, the electrochemical pump needs to be able to reverse itself so that the compressed liquid cooling agent at the former anode will flow back past the object to be cooled and into the gas space around the former cathode. Hence, to be effective, a heat exchange system utilizing a liquid cooling agent must be reciprocal—i.e.: it must be cyclic.

A solution to this problem was proposed in U.S. patent application Ser. No. 09/353,458 which is owned by the Applicant and is incorporated herein by reference. This application proposes an electrochemical pump that utilizes matching symmetrical hydrogen electrodes and a proton exchange membrane to produce an electrochemical pump utilizing a proton exchange membrane fuel cell. Such a cell's electrochemical reaction can be reversed by reversing the polarity of the power source connected to the electrodes of the cell. The pump can produce hydrogen gas at either electrode, and if the reaction is cyclically reversed, the production of hydrogen gas, and hence, the flow of the liquid coolant through the system, can be cycled.

To effectuate such a cyclic heat exchange system, the power supply can be a reverse-polarity power supply capable of switching the direction of current applied to the electrodes which reverses the chemical reactions that take place at the electrodes. The poles of the power supply should be designed to be switched if a voltage difference across the hydrogen electrodes is within the range of about 100 mV to 600 mV for single cell. When liquid is used as a heat carrier, the polarity should be switched so that each of the electrodes alternatively produce and consume gas. The power supply may be a battery or a rectifier circuit or any other electric source capable of delivering direct current.

Such a reciprocal electrochemical pump has many advantages over a standard electric or other pump. The electrochemical pump has no moving parts and hence is almost completely noiseless. The electrochemical pump is very efficient in that it takes a small amount of power from the electric source to remove a substantial amount of heat from the object to be cooled. And finally, the electrochemical pump can be made that is very small in size and has little mass.

Electrochemical-based cooling system is do have drawbacks over air-cooled and other heat transfer systems. As explained above, an electrochemical pump must be used in a process in order to be utilized in a cooling system. The pump produces fluid motion by generating gas at one electrode. However, this gas only pushes the cooling liquid in one direction. Hence, after the cooling liquid is pushed in one direction, the electrochemical pump's underlying reaction must be reversed so that gas can be produced at the opposite electrode thereby pushing the cooling liquid in the opposite direction. Such a system can be quite complicated in practice.

A second disadvantage of using an electrochemical pump as part of a heat exchange system is that water must be used as the cooling liquid. Vapor of the liquid used as the heat carrier penetrates in the pump area, condenses there, and adversely affects pump operation. To limit this effect, distilled water is used because the small amount of impurities limits the harmful effect on the electrodes. However, even if distilled water is used as the heat carrier, the condensation of the water vapor in the pump area creates a flooding problem for the electrode stack. Once flooding begins, it slows down hydrogen diffusion to the electrode which causes a decreased amount of hydrogen production. Such decreased amount of hydrogen production causes a decreased flow rate for the heat carrier water, which in turn causes a lower rate of heat transfer from the object to be cooled to the heat sinks. This makes the heat transfer system more efficient and decreases the object's temperature.

SUMMARY OF THE INVENTION

In accordance with the present invention, there is provided a radiator design in an electrochemical heat exchanger which contains a gas-based pumping or driving system which is capable of forcing movement of a liquid-based cooling system by way of a flexible diaphragm located integrally between the two systems. Preferably the gas-based pumping system is comprised of a hydrogen electrochemical pump which is capable of producing hydrogen gas at one electrode and consuming hydrogen gas at the other electrode thereby creating a pressure differential between the two electrodes. Preferably, the liquid-based cooling system is comprised of first and second liquid spaces which are mechanically coupled to first and second banks of radiator tubes or fins respectively to transfer heat from an object to be cooled, through the liquid cooling agent, and out of the heat exchange system by way of the radiator fins or tubes.

Preferably, the two flexible diaphragms which are located between the gas pump system and the liquid cooling system mechanically isolate the contents of the two systems while keeping the contents of the two systems in pressure contact with each other. Pressure contact is intended to mean that a pressure on one side of the diaphragm from the contents of one of the systems will result in a deforming of the diaphragm and a resultant increase in pressure and decrease in volume on the contents of the other system at the other side of the diaphragm.

BRIEF DESCRIPTION OF THE DRAWINGS

The invention is herein described, by way of example only, with reference to the accompanying drawings, wherein.

DETAILED DESCRIPTION OR THE PREFERRED EMBODIMENTS

The principles and workings of a radiator design utilizing an electrochemical heat exchange system can be better understood with reference to the drawing and the accompanying detailed description which describes possible embodiments of die radiator design according to the present invention.

In the preferred embodiment of the present invention, the pumping or driving system is comprised of a hydrogen electrochemical pump and first and second gas spaces. As explained above, when electric power is supplied to the electrodes of the electrochemical pump, hydrogen gas is produced at one electrode (cathode) in a reduction reaction and hydrogen gas is consumed at the other electrode (anode) in an oxidation reaction. The hydrogen gas produced at the cathode is collected in a first gas space. One wall of the first gas space is comprised of a flexible diaphragm. Preferably the diaphragm does not allow the hydrogen gas to pass through the diaphragm. Hence, as gas is forced into the gas space from the hydrogen pump, pressure will build up in the gas space, and specifically, pressure from the hydrogen gas will push on the flexible diaphragm. As this pressure increases, the diaphragm will flex away from or become convex with respect to the first gas space.

Likewise in the preferred embodiment of the present invention, a second gas space and a second flexible diaphragm exist. The anode of the pump is contained within the second gas space. One wall of the second gas space is comprised of a second flexible diaphragm which also does not allow hydrogen gas to pass through it. As explained above, when electric power is applied to the anode of the hydrogen pump, an oxidation reaction occurs that consumes hydrogen. Preferably, as the hydrogen pump runs and more hydrogen gas is consumed at the anode, the pressure in the second gas space decreases. As the pressure in the second gas space decreases, the pressure on the second flexible diaphragm likewise decreases. When the hydrogen pressure gets too low, the flexible diaphragm will flex towards or become concave with respect to the second gas space. This completes one half of the hydrogen pump cycle.

Once, the centers of the flexible diaphragms reach maximum displacement, the polarity of the power supply for the hydrogen pump will reverse itself. As described above, this reversal of polarity will reverse the reactions that take place at the hydrogen pump electrodes. Hence, the electrode at the first gas space will now consume hydrogen in an oxidation reaction and the electrode at the second gas space will produce hydrogen in a reduction reaction. In general, the former cathode has become the new anode and the former anode has become the new cathode.

Because of the oxidation reaction now taking place at the first electrode, the hydrogen gas in the first gas space will be consumed at the first electrode. Hence, the pressure in the first gas space due to the hydrogen gas will decrease, and the pressure on the wall of the first flexible diaphragm will decrease also. As the pressure decreases, the flexible diaphragm that was previously bent convex with respect to the first gas space will return to a neutral position with no center displacement at all. As even more hydrogen is consumed at the first electrode, the pressure on the wall of the first flexible diaphragm will decrease further and the center of the flexible diaphragm will flex towards or become concave with respect to the first gas chamber.

Preferably, the reversal of the polarity of the power supply to the hydrogen electrochemical pump will cause a reduction reaction to take place at the second electrode of the pump. As such reduction reaction occurs, hydrogen gas is produced at the second electrode and his hydrogen gas fills the second gas space. As more hydrogen gas is produced, the pressure in the second gas space increase slightly and stays almost constant because of moving liquid on the opposite side of the diaphragm. The substantially free moving liquid eliminates resistance for pushing the diaphragm from tie gas side. As the pressure in the second gas space increases, the pressure on the wall of the second flexible diaphragm likewise increases. With increased pressure, the second flexible diaphragm that was previously displaced concave with respect to the first gas space will return to a neutral position with no center displacement. As the pressure of the hydrogen gas in the second gas space increases still, the pressure on the wall of the second flexible diaphragm likewise increases and the flexible diaphragm will flex away from or concave to the second gas space. This completes one full cycle of the hydrogen pump.

Once the centers of the flexible diaphragms reach maximum displacement, the voltage across hydrogen pump increases which serves as a signal for switching the polarity of the power source. Once again, the first electrode will become the cathode and produce hydrogen in a reduction reaction. Once again, the second electrode will become the anode and consume hydrogen in an oxidation reaction. The power supply polarity can continually be reversed to manipulate the flexible diaphragms in a cyclic manner.

In the preferred embodiment of the present invention, there is also a liquid-based cooling system. Preferably, the movement of the cooling agent in the cooling system is manipulated by the gas driving system but the cooling agent is physically prevented from coming into contact with the hydrogen gas contained within the driving system.

Specifically, the preferred embodiment of the cooling system of the present invention is comprised of a first liquid space. One wall of the first liquid space is comprised of the first flexible diaphragm. The first flexible diaphragm does not allow the liquid cooling agent to pass through to the first gas chamber. As such, the first flexible diaphragm prevents the liquid cooling agent in the first liquid space from coming into physical contact with the hydrogen gas in the first gas space.

Preferably, another wall of the first liquid space contains an opening through which the liquid cooling agent can flow into the first bank of radiator tubes. The radiator tubes present a surface area that allows the heat from the liquid cooling agent to be dispersed through the surface of the radiator tubes and out away from the beat exchange system.

As discussed above, the pumping action of the gas-based drive system causes the center of the first flexible diaphragm to displace away from the first gas chamber. Likewise, this same displacement causes the center of the first flexible diaphragm to flex into or bend concave with respect to the first liquid space. The concave bending of the flexible diaphragm causes the volume of the first liquid space to decrease. As the volume of the first liquid space decreases, the liquid cooling agent inside the first liquid space is forced out of the first liquid space and into the first bank of radiator tubes.

Preferably, the opposite end of the first bank of radiator tubes opens into a heat exchange chamber. This heat exchange chamber is where the heat from the object to be cooled is transferred to the cooling agent inside the cooling system of the present heat exchange system. The object to be cooled can be directly contacted by the liquid cooling agent so that by well-known laws of thermodynamics, heat from the object to be cooled will pass to the liquid cooling agent and thereby lower the temperature of the object to be cooled. In another preferred embodiment of the present invention the liquid cooling agent will come into physical and thermal contact with a member that is in physical and thermal contact with the object to be cooled. Hence, the liquid cooling agent and the object to be cooled will be in thermal contact with each other, although the liquid cooling agent and the object to be cooled are not in direct physical contact with each other. In either case, heat from the object to be cooled will be transferred to the cooling agent thereby lowering the temperature of the object to be cooled and raising the temperature of the liquid cooling agent.

The opposite end of the heat exchange chamber is connected to a second bank of radiator tubes or fins. As in the first bank of radiator tubes, the second bank of radiator tubes provides a surface area for heat that has been absorbed by the cooling liquid to be transferred to the radiator tubes and out of the heat exchange system. The second bank of radiator tubes must allow the cooling liquid to flow through, but the size, shape, surface area, and position can be designed to provide the appropriate amount of heat removal by means that are well known in the art.

Preferably, at the opposite end of the second bank of radiator tubes there is a second liquid space. Similar to the first liquid space, one wall of the second liquid space is comprised of the second flexible diaphragm. As the liquid cooling agent is forced through the second bank of radiator tubes, the heat absorbed in the heat exchange chamber by the liquid cooling agent from the object to be cooled is transferred out of the heat exchange system by way of the second bank of radiator tubes or fins. After passing through the second bank of radiator tubes or fins, the liquid cooling agent is collected in the second liquid space. As described above, the center of the second flexible diaphragm has been bent towards or displaced concave with respect to the inside of the second gas space. This same deflection causes the center of the second flexible diaphragm to be bent away from or displaced convex to the inside of the second liquid space. Because of the bending of the second flexible diaphragm, the volume of the second liquid space is increased and the liquid cooling agent from the second bank of radiators has a place to collect.

As discussed above, in the preferred embodiment of the present invention, once the first and second flexible diaphragms reach maximum displacement, the polarity of the power supply to the hydrogen electrochemical pump is reversed and the chemical reactions taking place at the hydrogen pump electrodes likewise reverse. The reversal in polarity is provided by the IC signal which manages the power supply, IC receives the indication for polarity reverse because of rise voltage when diaphragm reaches maximum displacement. The eventual result of this power supply reversal is that the first and second flexible diaphragms will displace in the opposite direction as they a displaced when the electrochemical pump was in the first half of its cycle. This diaphragm reversal will reverse the flow of the liquid cooling agent through the heat exchange system.

Preferably, as the second flexible diaphragm bends convex to or away from the second gas space, this same movement causes the second flexible diaphragm to displace concave or towards the second liquid space. As such, the volume of the second liquid space decreases and the pressure from the second flexible diaphragm on the liquid cooling agent present in the second liquid space increases. Because of said decrease in volume and increase in pressure, the liquid cooling agent that is present in the second liquid space will be forced out of the second liquid cooling space and into the second bank of radiator tubes. The liquid cooling agent will pass the second bank of radiator tubes and enter he heat exchange chamber.

Once inside the heat exchange chamber, the liquid cooling agent will once again come into thermal contact with the object to be cooled. Heat from the object to be cooled will transfer as per well known thermodynamic, laws to the liquid cooling agent in the heat exchange chamber. As such, the temperature of the object to be cooled will decrease and the temperature of the liquid cooling agent will increase.

The increased temperature liquid cooling agent will next flow into the first bank of radiator tubes. As in the first half cycle of the present embodiment of the present invention, heat absorbed in the heat exchange chamber from the object to be cooled by the liquid cooling agent will be transferred through the surface of the radiator tubes and eventually out of the heat exchange system. The temperature of the liquid cooling agent will decrease as heat is transferred away from the liquid cooling agent, and the liquid cooling agent will continue to flow into the first liquid space.

The expression, which translate hear removal rate (W) as current Fiction of current across pump is:

$$W=1/2IN(Th-Tc)$$

Here: I is current across pump, N is number of series connected electrochemical cells, Th–Tc is temperature difference hot and cool water flows.

As discussed above, in the second half cycle of the present embodiment of the present invention, the first flexible diaphragm has been displaced concave to or bent toward the first gas space. This same movement results in the first flexible diaphragm displacing away from or bending convex to the first liquid space. This bending of the first flexible diaphragm causes the volume of the first liquid space to increase and gives the flowing liquid cooling agent an area to flow into.

Preferably, when the center of the first and second flexible diaphragm reach maximum displacement, the polarity of the power supply of the hydrogen pump will reverse and the chemical reactions at the electrodes of the hydrogen pump will likewise reverse. This completes one cycle of the hydrogen pump and one cycle of the flow of liquid cooling agent through the cooling system of the heat exchange system. Preferably, a maximum amount of heat has been transferred from the object to be cooled, through the liquid cooling agent, and out of the heat exchange system by way of the first and second bank of radiator tubes. This cycle can repeat itself to continue the cooling effect on the object to be cooled.

Figure 1:
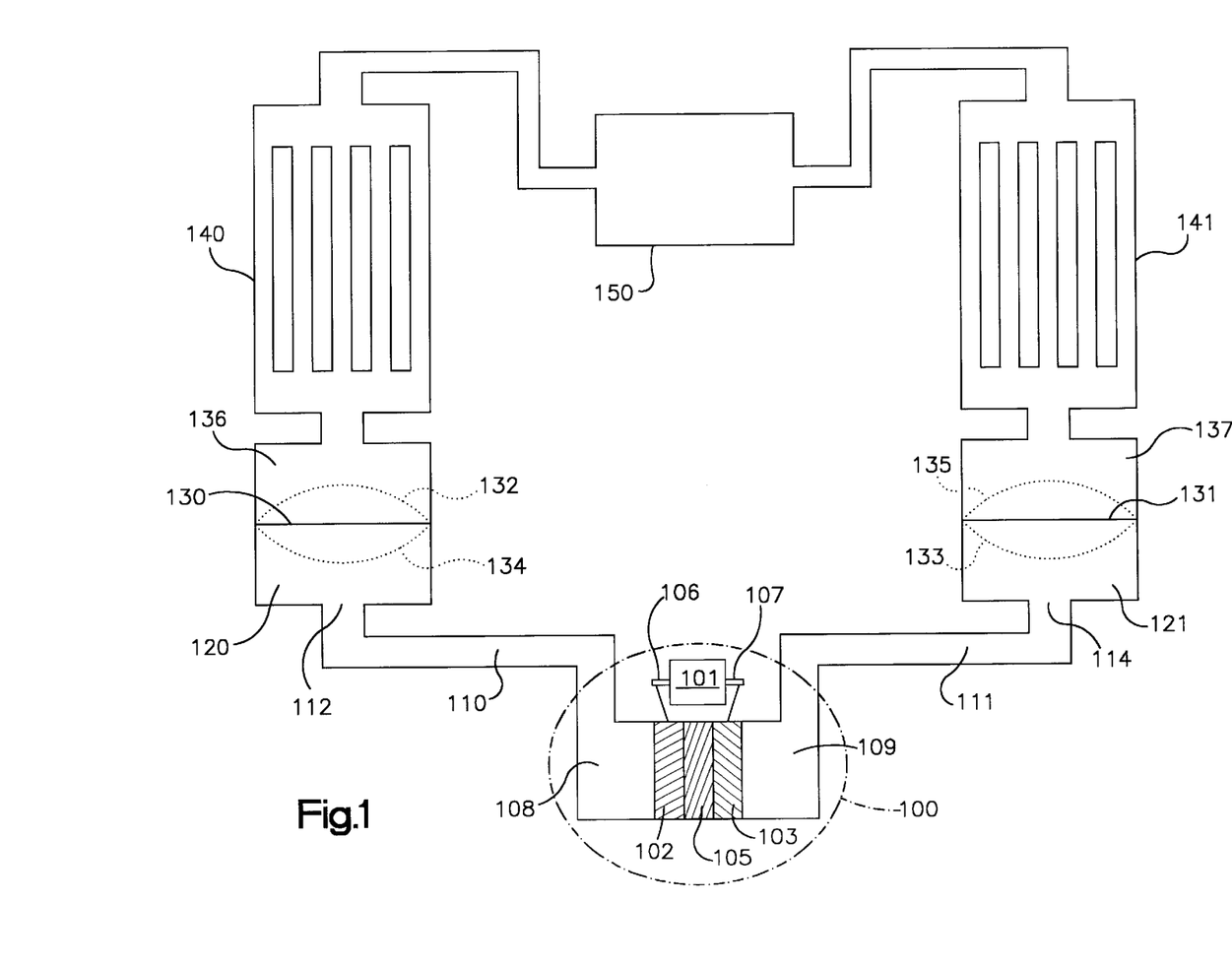
FIG. 1 is a graphical representation of the interconnection between the parts of the radiator of the present invention.

Referring now to the drawings, FIG. 1 shows a graphical representation of the components in a preferred embodiment of the radiator design utilizing an electrochemical heat exchange system. The pumping or driving system is comprised of a hydrogen electrochemical pump 100 and first and second gas spaces 120, 121.

The hydrogen electrochemical pump 100 of the preferred embodiment of the present invention is comprised of an electric power source 101, first and second hydrogen electrodes 102, 103, first and second electrode gas spaces 108, 109, and a proton exchange membrane ("PEM") 105. The PEM is also known in the industry as MEA (membrane electrode assembly). The preferred hydrogen pump 100 utilizes symmetrical hydrogen electrodes. "Symmetrical" means that both sides of a PEM contain substantially identical hydrogen electrodes. In this design, a first hydrogen electrode 102 is utilized as a cathode to produce hydrogen and a second hydrogen electrode 103 is utilized as an anode to consume hydrogen. In between these two electrodes, it is preferable to utilize a proton exchange membrane 105. Each of the electrodes 102, 103 is connected to opposite ends of a power supply 101 via terminals 106, 107.

When current from the power supply 101 is supplied to the electrodes 102, 103 of the electrochemical pump 100, hydrogen gas is produced at the first electrode 102 (cathode) in a reduction reaction and hydrogen gas is consumed at the second electrode 103 (anode) in an oxidation reaction The hydrogen gas produced at the cathode is collected in a first electrode gas space 108 that is contained within the hydrogen pump but is mechanically isolated from the second electrode 103 by the proton exchange membrane 102. The first electrode gas space 108 is connected to a first gas conduit 110 that allows hydrogen produced at the first electrode 102 to travel away from the hydrogen pump 100. The first gas conduit 110 opens into the first gas space 120 by way of the first gas inlet-outlet 112.

The first gas space 120 is a hollow chamber which has one wall comprised of a first flexible diaphragm 130. The first flexible diaphragm 130 is a membrane that is not permeable to either hydrogen gas or the liquid cooling agent to be used in the preferred embodiment of the electrochemical heat exchanger. Hence, as hydrogen gas is produced at the first electrode 102 in the electrochemical pump 100, the first electrode gas space 108 fills with hydrogen gas. As more hydrogen is produced, the gas travels into the first gas conduit 110, through the first gas inlet-outlet 112, and in the first gas space 120. As more hydrogen enters the first gas space 120, the pressure inside the first gas space increases. This pressure increase also increases the pressure on the face of the first flexible diaphragm 130 that faces the inside of the first gas space 120. Ultimately, the pressure inside the first gas space 120 will reach a point where the center of the first flexible diaphragm 130 will bend away from or become convex with respect to the inside of the first gas space. Such a center displacement is represented by the dotted line 132 in FIG. 1.

Likewise in the preferred embodiment of he present invention, a second gas space 121 and a second flexible diaphragm 131 exist. The oxidation reaction that occurs at the second electrode 103 (anode) consumes all of the hydrogen that is present in the second electrode gas space 109. The second electrode gas space 109 is connected to a second gas conduit 111. Finally, the second gas conduit 111 opens into the second gas space 121 by way of the second gas inlet-outlet 114. These interconnections allow all of the hydrogen gas in any of these areas to move into the second electrode as space 109 and be consumed in a oxidation reaction at the second electrode 103.

The second gas space 121 is a hollow chamber which has one wall comprised of a second flexible diaphragm 131. The second flexible diaphragm 131 is a membrane that is not permeable to either hydrogen gas or the liquid cooling agent to be used in the preferred embodiment of the electrochemical heat exchanger. Hence, hydrogen is pulled from the second gas space 121, through the second gas inlet-outlet 114, through the second gas conduit 111, and into the second electrode gas space 109 where the hydrogen is consumed in an oxidation reaction at the second electrode 10:3. As more hydrogen leaves the second gas space 121, the pressure inside the second gas space decreases. This pressure decrease also decreases the pressure on the face of the second flexible diaphragm 131 that faces the inside of the second gas space 121. Ultimately, the pressure inside the second gas space 121 will reach a point where the center of the second flexible diaphragm 131 will bend toward or become concave with respect to the inside of the first gas space. Such a center displacement is represented by the dotted line 133 in FIG. 1.

Once, the diaphragms 130, 131 reach the maximum displacement of the center portion of the diaphragms, the pump 100 has reached the halfway point in its pumping cycle, and the polarity of the power supply 101 for the hydrogen pump will reverse itself. This polarity reversal can be accomplished by a variety of different sensors that measure either the physical position of the first or second flexible diaphragm's displacement or some other characteristic of the heat exchange system. The reversal of polarity on the hydrogen pump power supply 101 will reverse the reactions that take place at the hydrogen pump electrodes 102, 103. Hence, the first electrode 102 will now consume hydrogen in an oxidation reaction (anode) and the second electrode 103 will now produce hydrogen in a reduction reaction (cathode). In general, the former cathode has become the new anode and the former anode has become the new cathode.

Because of the oxidation reaction now taking place at the first electrode 102, the hydrogen gas in the first gas space 120, first gas conduit 110, and first electrode gas space 108 will now be consumed at the first electrode 102. Hence, the pressure in the first gas space 120 due to the hydrogen gas will decrease, and the pressure on the wall of the first flexible diaphragm 130 will also decrease. As the pressure decreases, the first flexible diaphragm 130 that was previously bent convex with respect to the first gas space will return to a neutral position 130 with no center displacement at all. As even more hydrogen is consumed at the first electrode 102, the pressure on the wall of the first flexible diaphragm 130 will decrease further and the center of the flexible diaphragm will flex towards or become concave with respect to the first gas chamber 120. Such a center displacement is represented by the dotted line 134 in FIG. 1.

Preferably, the reversal of the polarity of the power supply 101 to the hydrogen electrochemical pump 100 will cause a reduction reaction to take place at the second hydrogen electrode 103 of the pump. As such reduction reaction occurs, hydrogen gas is produced at the second electrode 103 and this hydrogen gas fills the second electrode gas space 109. As more hydrogen gas is produced, the hydrogen will travel through the second gas conduit 111 and into the second gas space 121 by way of the second gas inlet-outlet 114 thereby causing the pressure in the second gas space 121 to increase. As the pressure in the second as space 121 increases, the pressure on the wall of the second flexible diaphragm 131 likewise increases. With increased pressure, the second flexible diaphragm 131 that was previously displaced concave with respect to the first gas space will return to a neutral position 131 with no center displacement. As the pressure of the hydrogen gas in the second gas space 121 increases still more, the pressure on the wall of the second flexible diaphragm 131 likewise increases and the flexible diaphragm will flex away from or concave to the second gas space. Such a center displacement is represented by the dotted line 135 in FIG. 1.

Preferably, once the center of the flexible diaphragms 130, 131 displace to the maximum, the polarity of the power source 101 of the electrochemical pump 100 will reverse again. Once again, the first electrode 102 will become the cathode and produce hydrogen in a reduction reaction. Once again, the second electrode 103 will become the anode and consume hydrogen in an oxidation reaction. The power supply 101 polarity can continually be reversed to manipulate the flexible diaphragms 130, 131 in a cyclic manner.

It should be noted that although the various gas spaces in the gas driving system have been described in detail with various gas spaces and conduits, in actual practice the electrochemical gas driving system need only preferably be comprised of a reversible electrochemical pump, first and second gas spaces with interiors in contact with the opposite ports of the electrochemical pump, and first and second flexible diaphragms to mechanically isolate the contents of the gas driving system from the contents of the liquid cooling system while maintaining a pressure coupling between the contents of the two systems. Any other elaboration or extra components were inserted merely for ease of understanding and for illustrative purposes only.

In the preferred embodiment of the present invention, there is also a liquid-based cooling system. Preferably, the movement of the cooling agent in the cooling system is dictated by the gas driving system, but the cooling agent is physically prevented from coming into contact with the hydrogen gas contained within the driving system. The contents of the gas driving system (hydrogen gas) and the contents of the liquid cooling system (liquid cooling agent) are coupled only by mechanical pressure through the first and second flexible diaphragm membranes 130, 131.

Specifically, the preferred embodiment of the cooling system of the present invention is comprised of a first liquid space 136. One wall of the first liquid space 136 is comprised of the first flexible diaphragm 130. The first flexible diaphragm 130 does not allow tie liquid cooling agent to pass through to the first gas space 120. As such, the first flexible diaphragm 130 prevents the liquid cooling agent in the first liquid space 136 from coming into physical contact with the hydrogen gas in the first gas space 120.

Preferably, another wall of the first liquid space 136 contains an opening through which the liquid cooling agent can flow into the first bank of radiator tubes 140. The first bank of radiator tubes 140 can be either hollow tubes, hollow fins, or any other heat transfer device as is well known in the art. The radiator tubes 140 present a surface area that allows the heat from the liquid cooling agent to be dispersed through the surface of the radiator tubes and out away from the heat exchange system.

As discussed above, the pumping action of the gas-based drive system causes the center of the first flexible diaphragm 130 to displace away from the first gas chamber 120. Likewise, this same displacement results in the center of the first flexible diaphragm 130 flexing into or bending concave with respect to the first liquid space 136. Such a center displacement is represented by the dotted line 132 in FIG. 1. The concave bending of the flexible diaphragm causes the volume of the first liquid space 136 to decrease. As the volume of the first liquid space 136 decreases, the liquid cooling agent inside of the first liquid space 136 is forced out of the first liquid space and into the first bank of radiator tubes 140.

Preferably, the opposite end of the first bank of radiator tubes 140 opens into a heat exchange chamber 150. Tis heat exchange chamber 150 is where the heat from the object to be cooled is transferred to the cooling agent inside the cooling system of the present heat exchange system. The object to be cooled can be directly contacted by the liquid cooling agent so that, by well-known laws of thermodynamics, heat from the object to be cooled will pass to the liquid cooling agent and, hence, lower the temperature of the object to be cooled. In another preferred embodiment of the present invention, the liquid cooling agent will come into physical and thermal contact with a member that is in physical and thermal contact with the object to be cooled. Hence, the liquid cooling agent and the object to be cooled will be in thermal contact with each other through this additional member, although the liquid cooling agent and the object to be cooled are not in direct physical contact with each other. In either case, heat from the object to be cooled will be transferred to the cooling agent thereby lowering the temperature of the object to be cooled and raising the temperature of the liquid cooling agent.

The opposite end of the heat exchange chamber 150 is connected to a second bank of radiator tubes or fins 141. As in the first bank of radiator tubes 140, the second bank of radiator tubes 141 provides a surface area for heat that has been absorbed by the cooling liquid to be transferred to the radiator tubes 141 and out of the heat exchange system. The second bank of radiator tubes 141 must allow the cooling liquid to flow through, but the size, shape, surface area, and position can be designed to provide the appropriate amount of heat removal by means that are well known in the art.

Preferably, at the opposite end of the second bank of radiator tubes 141 there is a second liquid space 137. Similar to the first liquid space 136, one wall of the second liquid space 137 is comprised of the second flexible diaphragm 131. As the liquid cooling agent is forced through the second bank of radiator tubes 141, the heat absorbed in the heat exchange chamber 150 by the liquid cooling agent from the object to be cooled is transferred out of the heat exchange system by way of the second bank of radiator tubes or fins 141. After passing through the second bank of radiator tubes or fins 141, the liquid cooling agent is collected in the second liquid space 137. As described above, the center of the second flexible diaphragm 131 has been bent towards or displaced concave with respect to the inside of the second gas space. This same deflection causes the center of the second flexible diaphragm 131 to be bent away from or displaced convex to the inside of the second liquid space. Such a center displacement is represented by the dotted line 133 in FIG. 1. Because of the bending of the second flexible diaphragm 131, the volume of the second liquid space 137 is increased and the liquid cooling agent from the second bank of radiators 141 has a place to collect.

As discussed above, in the preferred embodiment of the present invention, once the first and second flexible diaphragms 130, 131 reach maximum displacement, the polarity of the power supply 101 to the hydrogen electrochemical pump 100 is reversed and the chemical reactions taking place at the hydrogen pump electrodes 102, 103 also reverse. As explained above, the eventual result of this power supply 101 reversal is that the first and second flexible diaphragms 130, 131 will displace in the opposite direction as the first and second diaphragms displaced when the electrochemical pump was in the first half of its cycle. This diaphragm reversal will reverse the flow of the liquid cooling agent through the heat exchange system. Such a reversal of flexible diaphragm center displacement is represented by the dotted lines 134,135 in FIG. 1.

Preferably, as the second flexible diaphragm 130 bends convex to or away from the second gas space 121, this same movement causes the second flexible diaphragm to displace concave or towards the second liquid space 137. Such a center displacement is represented by the dotted line 135 in FIG. 1. As such, the volume of the second liquid space 137 decreases and the pressure from the second flexible diaphragm 131 on the liquid cooling agent present in the second liquid space 137 increases. Because of said decrease in volume and increase in pressure, the liquid cooling agent that is present in the second liquid space 137 will be forced out of the second liquid space and into the second bank of radiator tubes 141. The liquid cooling agent will pass the second bank of radiator tubes 141 and enter the heat exchange chamber 150.

Once inside the heat exchange chamber 150, the liquid cooling agent will once again come into thermal contact with the object to be cooled—either directly or through an intermediate member. Heat from the object to be cooled will transfer as per well known thermodynamic laws to the liquid cooling agent in the heat exchange chamber 150. As such, the temperature of the object to be cooled will decrease and the temperature of the liquid cooling agent will increase.

The increased-temperature liquid cooling agent will next flow into the first bank of radiator tubes 140. As in the first half cycle of the present embodiment of the present invention, heat absorbed in the heat exchange chamber 150 from the object to be cooled by the liquid cooling agent will be transferred through the surface of the radiator tubes 140 and eventually out of the heat exchange system. The temperature of the liquid cooling agent will decrease as heat is transferred away from the liquid cooling agent, and the liquid cooling agent will continue to flow into the first liquid space 136.

As discussed above, in the second half cycle of the present embodiment of the present invention, the first flexible diaphragm 130 has been displaced concave to or bent toward the first gas space 120. This same movement results in the first flexible diaphragm 130 displacing away from or bending convex to the first liquid space 136. Such a center displacement is represented by the dotted line 134 in FIG. 1. This bending of the first flexible diaphragm 130 causes the volume of the first liquid space 136 to increase and gives the flowing liquid cooling agent an area to flow into. Preferably, when the center of the first and second flexible diaphragms 130, 131 reach maximum displacement, the polarity of the power supply 101 of the hydrogen pump 100 will reverse and the chemical reactions at the electrodes 102, 103 of the hydrogen pump 100 will likewise reverse. This completes one cycle of the hydrogen pump 100 and one cycle of the flow of liquid cooling agent through the cooling system of the heat exchange system. Preferably, a maximum amount of heat has been transferred from the object to be cooled, through the liquid cooling agent, and out of the, beat exchange system by way of the first and second banks of radiator tubes 140, 141. This cycle can repeat itself to continue the cooling effect on the object to be cooled.

Figure 2:
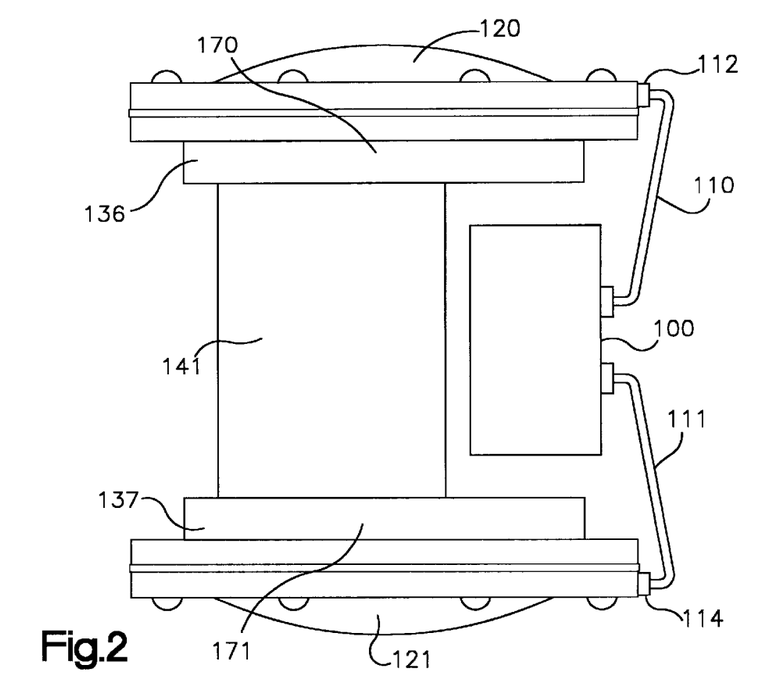
FIG. 2 is a side elevation view of one preferred embodiment of the radiator of the present invention.
Figure 3:
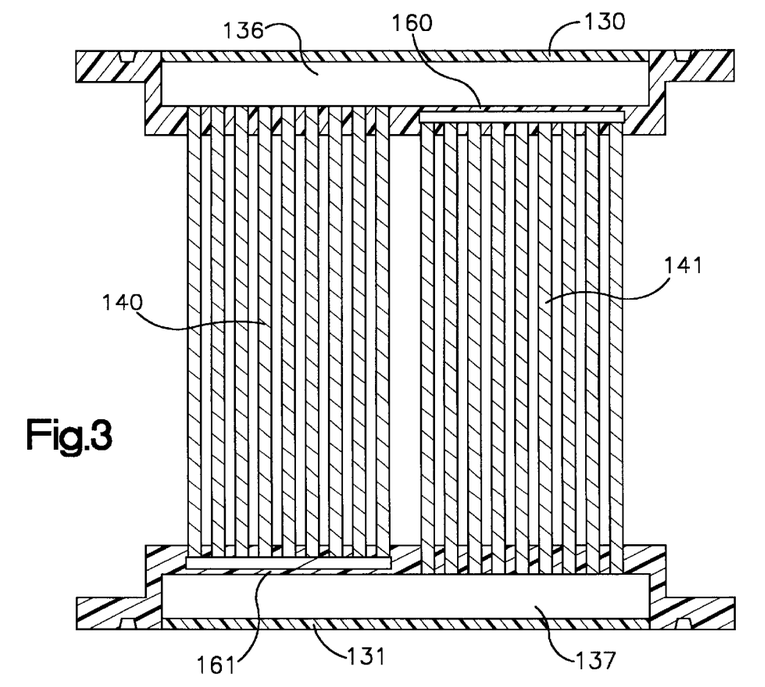
FIG. 3 is a front elevation view of the liquid cooling system of the present invention showing a preferred orientation of the first and second radiator tube banks.

FIG. 2 shows one preferred orientation of the components of the electrochemical heat exchanger. Such components are placed to reduce the size of the beat exchange system while maintaining a maximum amount of heat transfer. Specifically, FIG. 2 shows the heat exchange system from a side elevational view. FIG. 3 shows a sectional view of the back elevation of a preferred embodiment of the liquid cooling system of the present invention. In FIG. 3, the gas driving system has been removed to facilitate identification of internal device components. By examining these two drawings together, we can determine a preferred orientation for the heat exchanger elements. The reference numbers in FIG. 2 and FIG. 3 have been kept consistent with the reference numbers in FIG. 1 for clarity.

The hydrogen pump 100 causes hydrogen gas to be released and to travel into the first gas conduit 110, through the first gas inlet-outlet 112, and finally into the first gas space 120. Adjacent to the first gas space 120 is a first liquid space 136. A first flexible diaphragm 130 is located integrally between the first gas space 120 and the first liquid space 136. This first flexible diaphragm 130 moves in response to pressure differential in the gas driving system. This diaphragm movement thereby causes the liquid coolant in the cooling system to flow.

The first liquid space 136 is mechanically coupled and internally open (hollow) to a first bank of radiator tubes 140.

The first liquid space 136 filled with liquid coolant is mechanically coupled but internally closed to a second bank of radiator tubes 141 on the other side. A first liquid shield 160 covers the open hole between the first liquid space 136 and the second bank of radiator tubes 141.

As the first flexible diaphragm displacement forces the liquid cooling agent out of the first liquid space 136, the liquid cooling agent passes through the first bank of radiator tubes 140 and out the first liquid inlet-outlet 170. From here, the liquid goes to the heat exchange chamber 150, which is not strictly part of the radiator design of the present invention, where the cooling agent draws heat off of the object to be cooled.

After heating, the liquid cooling agent re-enters tie radiator heat exchange system by way of the second liquid inlet-outlet 171. The liquid coolant is fed into the second bank of radiator tubes 141 for heat transfer from the liquid cooling agent, through the surface of the radiator tubes, and out away from the thermal exchange system. The liquid coolant's temperature reduces and it is forced out of the left bank of radiator tubes 141 into the second liquid space 137.

One wall of the second liquid space 137 is comprised of a second liquid shield 161 to prevent the liquid cooling agent from reentering the first bank of radiator tubes 140. Another wall of the second liquid space 137 is made up of a second flexible diaphragm 131 similar to the first flexible diaphragm 130. The opposite face of th second flexible diaphragm 131 makes up one wall of a second gas space 121. As more coolant enters the second liquid space 137, the pressure on the liquid side of the second flexible diaphragm 131 increases. The increased pressure causes the diaphragm 131 to flex into the second gas space 137 thereby reducing the volume of the second gas space.

The second gas space 121 is mechanically coupled to a hollow second gas inlet-outlet 114 which empties into a second gas conduit tube 111. This second gas conduit tube 111 empties into the hydrogen electrochemical pump 100 at the opposite side from where the first gas conduit tube 110 exited the hydrogen pump 100. As the pump operates, thereby forcing hydrogen as out of the hydrogen pump 100 and into the first gas tube 110, hydrogen gas is taken into the other side of the pump through the second gas tube 111 to be used by the plump. This completes one half of the heat transfer cycle. As discussed above, the polarity on the hydrogen pump's power supply will be reversed and the second half of the heat transfer cycle will take place in the reverse order. Upon completion, the power supply's polarity will reverse again, and the process will start over from the beginning.

As the pump operates, minute amounts of hydrogen can escape from the gas driving system. Although not shown, it is possible to use a metal hydride compensating plate to compensate for hydrogen lost during leakage. The metal hydride compensating plate should be able to occlude hydrogen and is designed to occlude or disassociate hydrogen upon a loss of hydrogen from the system below a predetermined level. Although hydrogen leakage generally is minor, without a source of compensation, it may cause serious problems. If hydrogen pressure drops as a result of hydrogen leakage, hydrogen will escape from the metal hydride plate and will compensate for the loss of hydrogen. The hydrogen capacity of the plate should be enough for compensation of hydrogen leakage during the lifetime of the electrochemical beat exchanger. Assuming free gas volume of the electrochemical heat exchanger is equal to $V$ ($m^3$) and average pressure is equal to $P$ (Pa), the total number of hydrogen molecules in the gas space of the electrochemical heat exchanger is:

$$n = PV/RT$$

Here: R is the molar gas constant and equal to 8.31 Jmol$^{-1}$K$^{-1}$, and T is Kelvin temperature. If the electrochemical heat exchanger has a 50% hydrogen loss per year, total hydrogen lost during a five-year cycle life would be 250%. This means that the compensated metal hydride plate should contain at least 0.96875 PV/RT molecules hydrogen. If it is necessary to remove 100 watts of heat, the free volume of the electrochemical beat exchanger would be equal to $3 \times 10^{-4}$m$^3$.

As evidenced by the above detailed description of the preferred embodiments, the present invention provides an effective design for an electrochemical radiator that minimizes th size and weight of the radiator if necessary to lower the temperature of small electronic or other devices.

Further, the present invention isolates the liquid cooling agent from the contents of the gas driving system thereby allowing any liquid to be used as the cooling agent. Because the liquid will not flood or contact the driving system electrodes, the liquid (or even gas) with the most relevant thermal characteristics can be chosen.

Further, the present invention relies on an internal gas driving system rather than gravity or some other external force to circulate the liquid cooling agent through the cooling system. Hence, the orientation of the elements of the present invention with respect to any external body is irrelevant and the present heat exchange system will operate in any such orientation.

Finally, although this invention has been shown and described with respect to detailed embodiments thereof, it will be understood by those skilled in the art that various changes in form and detail thereof may be made without departing from the spirit and scope of the claimed invention.

What is claimed is:

1. A reciprocal heat exchange system comprised of:
   a gas-based driving system including at least one radiator for heat exchange;
   a liquid-based cooling system; and
   a plurality of flexible membranes located integrally between said gas-based driving system and said liquid-based cooling system, wherein said plurality of membranes physically isolate the contents of said gas-based driving system from said liquid-based cooling system.

2. A reciprocal heat exchange system according to claim 1, wherein said gas-based driving system is comprised of:
   a hydrogen electrochemical pump comprised of at least two electrodes that can reversibly generate and consume hydrogen in chemical reactions;
   a first gas space which surrounds one of said at least two electrodes;
   a second gas space which surrounds a second of said at least two electrodes.

3. The reciprocal heat exchange system of claim 2, wherein said at least two electrodes are first and second identical hydrogen electrodes.

4. The reciprocal heat exchange system of claim 3, wherein said hydrogen electrochemical pump is further comprised of:
   a reversible electric source comprised of a first electric terminal electrically connected to said first hydrogen electrode and a second electric terminal electrically connected to said second hydrogen electrode, whereby reversing the polarity of said reversible electric source reverses the chemical reactions taking place at said first and second hydrogen electrodes.

5. A reciprocal heat exchange system according to claim 1, wherein said liquid-based cooling system is comprised of:
   a first liquid space;
   a first bank of radiator tubes wherein said first ban of radiator tubes is mechanically connected to said first liquid space at one end;
   a second liquid space;
   a second bank of radiator tubes wherein said second bank of radiator tubes is mechanically connected to said second liquid space at one end;
   a heat exchange chamber connecting said first bank of radiator tubes to said second bank of radiator tubes.

6. The reciprocal heat exchange system of claim 5, wherein said heat exchange chamber contains a liquid cooling agent.

7. The reciprocal heat exchange system of claim 5, wherein said first and second banks of radiator tubes provide a surface area to release heat out of the reciprocal heat exchange system.

8. A reciprocal heat exchange system according to claim 1, further comprised of:
   a metal hydride compensation plate located within the gas-based driving system.

9. A reciprocal heat exchange system comprised of:
   an electrochemical pump;
   a first gas space mechanically coupled to said electrochemical pump
   a second gas space mechanically coupled to said electrochemical pump;
   a first liquid space;
   a first radiator bank, wherein said first radiator bank is mechanically coupled to said first liquid space;
   a second liquid space;
   a second radiator bank, wherein said second liquid space is mechanically coupled to said second radiator bank;
   a heat exchange space, wherein said heat exchange space is mechanically coupled to said first radiator bank and mechanically coupled to said second radiator bank;
   a first flexible diaphragm, wherein said first flexible diaphragm is mechanically coupled to said first gas space and mechanically coupled to said first liquid space; and
   a second flexible diaphragm, wherein said second flexible diaphragm is mechanically coupled to said second gas space and mechanically coupled to said second liquid space.

10. A reciprocal heat exchange system according to claim 9, further comprised of:
    a metal hydride compensation plate within the electrochemical pump.

11. A reciprocal heat exchange system according to claim 9, further comprised of:
    a first gas located within said first gas space;
    a second gas located within said second gas space;
    a liquid cooling agent located within said first and second liquid spaces, said first and second radiator banks, and said heat exchange space.

12. A reciprocal heat exchange system according to claim 11, wherein said first flexible diaphragm physically isolates said first gas from said liquid cooling agent while maintaining pressure contact between said first gas and said liquid cooling agent and wherein said second flexible diaphragm physically isolates said second gas from said liquid cooling agent while maintaining pressure contact between said second gas and said liquid cooling agent.

13. A method of cooling an object comprised of:

producing hydrogen gas in a cathodic space;

providing a flexible diaphragm between hydrogen gas and a liquid cooling agent;

consuming hydrogen gas in an anodic space;

said produced hydrogen gas forcing the flexible diaphragm to force said liquid cooling agent into thermal contact with the object;

said produced hydrogen gas forcing a liquid cooling agent into thermal contact with a bank of radiator tubes.

14. The method of cooling an object of claim 13, further comprised of:

reversing the reactions in the cathodic and anodic gas spaces so that hydrogen gas is consumed in the cathodic space and hydrogen gas is consumed in the anodic space.

15. The method of cooling an object of claim 13, further comprised of:

providing a first flexible diaphragm between said cathodic space and said liquid cooling agent;

providing a second flexible diaphragm between said anodic space and said liquid cooling agent;

physically isolating the hydrogen gas produced in the cathodic space and the liquid cooling agent while maintaining pressure contact between the hydrogen gas produced in the cathodic space and the liquid cooling agent;

physically isolating the hydrogen gas consumed in the anodic space and the liquid cooling agent while maintaining pressure contact between the hydrogen gas consumed in the anodic space and the liquid cooling agent.

16. The method of cooling an object according to claim 13, wherein the production of hydrogen gas in the cathodic space and the consumption of hydrogen gas in the anodic space are cyclically reversed so that hydrogen gas is alternately produced and consumed in the cathodic and anodic spaces.

* * * * *

UNITED STATES PATENT AND TRADEMARK OFFICE
CERTIFICATE OF CORRECTION

PATENT NO. : 6,425,440 B1
DATED : July 30, 2002
INVENTOR(S) : Tsenter et al.

It is certified that error appears in the above-identified patent and that said Letters Patent is hereby corrected as shown below:

Column 1,
Line 35, change the word "be" to -- the --.

Column 2,
Line 10, change the word "beat" to -- heat --.
Line 13, change the word "ill" to -- in --.
Line 14, change the word "art" to -- an --.

Column 3,
Line 63, delete the words "system is" and add the word -- systems --.

Column 4,
Line 64, change the word "OR" to -- OF --.

Column 5,
Line 3, change the word "die" to -- the --.
Line 66, change the word "his" to -- this --.

Column 6,
Line 4, change the word "tie" to -- the --.
Line 16, change the word "centers" to -- center --.
Line 46, change the word "beat" to -- heat --.

Column 7,
Line 51, delete the word "a".
Line 67, change the word "he" to -- the --.

Column 8,
Line 19, change the word "Fiction" to -- function --.

Column 9,
Line 25, change the word "in" to -- into --.
Line 36, change the word "he" to -- the --.
Line 46, change the word "as" to -- gas --.
Line 57, change "10:3" to -- 103 --.

Column 10,
Line 44, change the word "as" to -- gas --.

UNITED STATES PATENT AND TRADEMARK OFFICE
CERTIFICATE OF CORRECTION

PATENT NO. : 6,425,440 B1
DATED : July 30, 2002
INVENTOR(S) : Tsenter et al.

It is certified that error appears in the above-identified patent and that said Letters Patent is hereby corrected as shown below:

Column 11,
Line 25, change the word "tie" to -- the --.
Line 53, change the word "Tis" to -- This --.

Column 13,
Lines 38 and 44, change the word "beat" to -- heat --.
Line 64, change the word "differential" to -- differentials --.

Column 14,
Line 14, change the word "tie" to -- the --.
Line 28, change the word "th" to -- the --.
Line 41, change the word "as" to -- gas --.
Line 44, change the word "plump" to -- pump --.
Line 65, change the word "beat" to -- heat --.

Column 15,
Line 13, change the word "beat" to -- heat --.
Line 18, change the word "th" to -- the --.
Line 40, after "system", delete the phrase "including at least one radiator for heat exchange".
Line 42, after "system", insert the phrase -- including at least one radiator for heat exchange --.

Column 17,
Line 15, after "forcing", delete the word "a".
Line 15, after "forcing", insert the phrase -- the flexible diaphragm to force said --.

Signed and Sealed this

First Day of April, 2003

JAMES E. ROGAN
*Director of the United States Patent and Trademark Office*